United States Patent
Abu-Irshaid et al.

(10) Patent No.: US 10,590,797 B2
(45) Date of Patent: Mar. 17, 2020

(54) IMPEDANCE TUBE HAVING A MACHINED UNION

(71) Applicant: DOOSAN HEAVY INDUSTRIES & CONSTRUCTION CO., LTD., Changwon-si, Gyeongsangnam-do (KR)

(72) Inventors: Esam Abu-Irshaid, Lake Worth, FL (US); Kevin James Spence, Jupiter, FL (US)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 169 days.

(21) Appl. No.: 15/927,662

(22) Filed: Mar. 21, 2018

(65) Prior Publication Data

US 2019/0292935 A1  Sep. 26, 2019

(51) Int. Cl.
| | |
|---|---|
| F01D 21/14 | (2006.01) |
| F01D 21/00 | (2006.01) |
| G01L 19/08 | (2006.01) |
| G01L 19/14 | (2006.01) |
| G01L 19/00 | (2006.01) |

(52) U.S. Cl.
CPC .......... *F01D 21/003* (2013.01); *F01D 21/14* (2013.01); *G01L 19/0007* (2013.01); *G01L 19/086* (2013.01); *G01L 19/142* (2013.01); *F05D 2260/80* (2013.01)

(58) Field of Classification Search
CPC ....... F01D 21/003; F01D 21/14; G01L 19/142
See application file for complete search history.

(56) References Cited

U.S. PATENT DOCUMENTS

| | | | |
|---|---|---|---|
| 7,017,415 B2 | 3/2006 | Harrold et al. | |
| 2003/0024318 A1 | 2/2003 | Brehm et al. | |
| 2008/0127504 A1 | 6/2008 | St. Louis et al. | |
| 2010/0175482 A1 | 7/2010 | Kurtz et al. | |
| 2014/0338332 A1* | 11/2014 | Portillo Bilbao | F23R 3/002 60/725 |
| 2018/0094815 A1* | 4/2018 | Abu-Irshaid | F23R 3/002 |
| 2018/0202661 A1* | 7/2018 | Abu-Irshaid | F23R 3/16 |
| 2019/0284944 A1* | 9/2019 | Abu-Irshaid | F01D 25/12 |

OTHER PUBLICATIONS

A Korean Office Action dated Jun. 28, 2019 in connection with Korean Patent Application No. 10-2018-0047993 which corresponds to the above-referenced U.S. application.

* cited by examiner

*Primary Examiner* — Jamel E Williams
(74) *Attorney, Agent, or Firm* — INVENSTONE Patent, LLC

(57) ABSTRACT

A combustion system can include: a liner defining a combustion chamber; a casing covering the combustion chamber; a first tube disposed in the liner; a machined union disposed inside the casing and connected to the first tube; a second tube passing through the casing and connected to the machined union; a sensor housing disposed outside the casing and connected to the second tube; and an infinite tube connected to the sensor housing.

20 Claims, 6 Drawing Sheets

IMPEDANCE TUBE HAVING A MACHINED UNION

BACKGROUND OF INVENTION

A gas turbine generally comprises a compressor, a combustor, and a turbine. The compressor provides compressed air generated by a plurality of compressor blades to the combustor, wherein the compressed air is high-temperature and high-pressure air. The combustor mixes the compressed air, introduced from the compressor, with fuel and combusts the mixed air. The combusted gas generated from the combustor is discharged to the turbine and the turbine is rotated by the combusted gas, thereby generating power. The generated power is used in various fields such as for the generation of electricity and to drive machinery. The gas turbine is used to drive a generator, an aircraft, a locomotive, and the like.

When the combustion occurs in the combustor to make a combusted gas, the combustion is under high-temperature and high-pressure conditions; thus the combustor is susceptible to High Cycle Fatigue (HCF) resulting from the combustion dynamics. The combustor needs to monitor the combustion dynamics, and an impedance tube with a dynamic sensor is used to monitor the combustion dynamics. The state of the art impedance tube including a dynamic sensor comprises a waveguide having an inner diameter of ⅛ inch for routing because a space to install the dynamic sensor is not available and the dynamic sensor is expensive and sensitive to several factors. However, the dynamic sensor connected to the small inner diameter waveguide has difficulty in sensing high frequencies due to excessive damping.

BRIEF SUMMARY

The present invention relates to a combustion system, more particularly, to an impedance tube including a first tube disposed inside a combustor and a second tube disposed outside the combustor.

In an embodiment of the present invention, an impedance tube can include: a machined union including a first channel and a second channel; a first tube connected to the first channel of the machined union; a second tube connected to the second channel of the machined union; a sensor housing including a sensor and connected to the second tube; and an infinite tube connected to the sensor housing, wherein the second channel includes a channel thread, and wherein a threaded end of the second tube is coupled with the channel thread of the second channel.

In another embodiment of the present invention, a combustion system comprises: a liner defining a combustion chamber; a casing covering the combustion chamber; a first tube disposed in the liner; a machined union disposed inside the casing and connected to the first tube; a second tube passing through the casing and connected to the machined union; a sensor housing disposed outside the casing and connected to the second tube; and an infinite tube connected to the sensor housing.

In yet another embodiment of the present invention, a gas turbine comprises: a compressor providing a compressed air; a combustor receiving the compressed air and producing a combusted gas; a turbine receiving the combusted gas from the combustor; and an impedance tube monitoring combustion dynamics of the combustor, wherein the impedance tube comprises: a first tube disposed in the combustor; a machined union disposed inside the combustor and connected to the first tube; a second tube passing through a casing of the combustor and connected to the machined union; a sensor housing disposed outside the combustor and connected to the second tube; and an infinite tube connected to the sensor housing.

DETAILED DISCLOSURE

Figure 1:
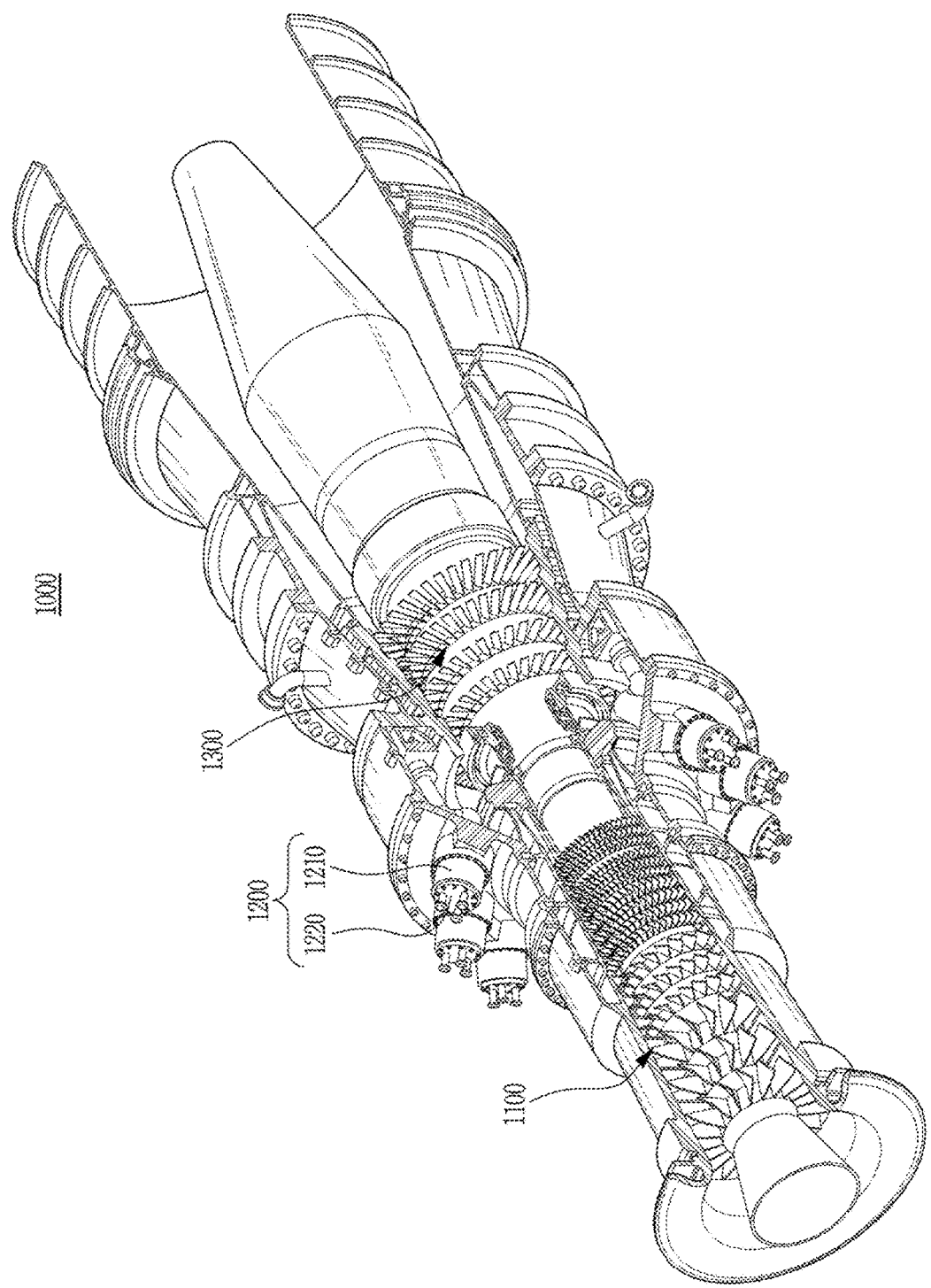
FIG. 1 shows a gas turbine according to an embodiment of the present invention.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present. The terms "includes" and "including" are equivalent to "comprises" and "comprising", respectively.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated. In addition, the terms "first" and "second" can be selectively or exchangeably used for the members.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, a dimension of each of the elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted.

It is to be understood that the figures and descriptions of embodiments of the present invention have been simplified to illustrate elements that are relevant for a clear understanding of the invention, while eliminating (in certain cases), for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Figure 2:
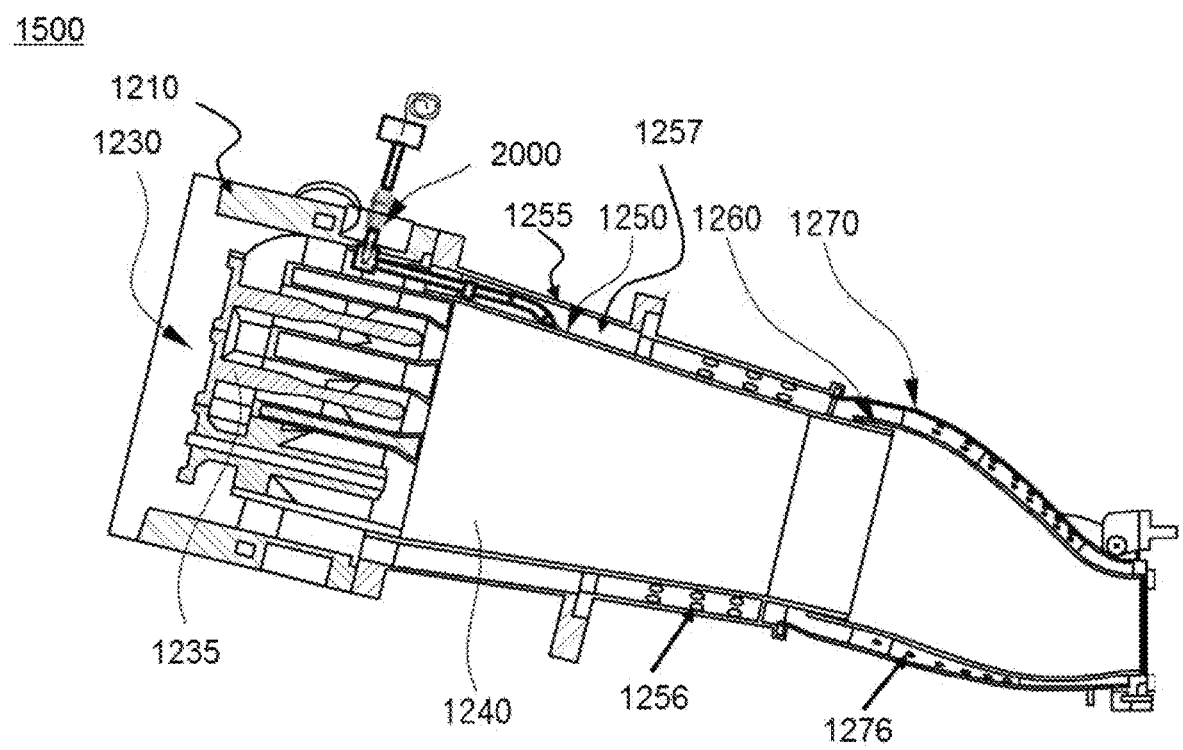
FIG. 2 shows a combustion system according to an embodiment of the present invention.

Reference will be made to the attached figures on which the same reference numerals are used throughout to indicate the same or similar components. FIG. 1 shows a gas turbine according to an embodiment of the present invention. FIG. 2 shows a combustion system according to an embodiment of the present invention. Referring to FIGS. 1 and 2, the gas turbine 1000 according to the embodiment of the present invention includes a compressor 1100, a combustor 1200, and a turbine 1300. The compressor 1100 includes a plurality of blades, which are arranged in a radial fashion. The compressor 1100 rotates the plurality of blades, and air is thus moved while being compressed due to the rotation of the plurality of blades. In an embodiment, the compressor 1100 may be directly or indirectly connected to the turbine 1300 so as to receive some of the power generated by the turbine 1300, which is in turn used to rotate the plurality of blades.

The air compressed in the compressor 1100 is moved to the combustor 1200. The combustor 1200 includes a plurality of casings 1210 and a plurality of burners 1220, which are arranged in a circular pattern.

The combustor 1200 comprises a head end plate 1230, a combustion chamber 1240, an inner liner 1250, an outer liner 1255, a liner channel 1257, an inner transition piece 1260, and an outer transition piece 1270. The outer liner 1255 defines an external wall of the combustion chamber 1240 and extends in one direction. The outer liner 1255 may be configured to have a cylindrical shape. The inner liner 1250 defines the combustion chamber 1240 and is spaced apart from the outer liner 1255 such that the liner channel 1257 is formed between the inner liner 1250 and the outer liner 1255. The casing 1210 and the head end plate 1230 cover the combustion chamber 1240 such that the compressed air provided by the compressor 1100 passes through the liner channel 1257 and then is introduced into the combustion chamber 1240.

The inner transition piece 1260 and the outer transition piece 1270 are disposed between the combustion chamber 1240 and the turbine 1300 such that the combusted gas generated in the combustion chamber 1240 is guided to the turbine 1300. The inner transition piece 1260 and the outer transition piece 1270 may be connected to the inner liner 1250 and the outer liner 1255, respectively. The outer liner 1255 and the outer transition piece 1270 may have a plurality of liner holes 1256 and a plurality of transition holes 1276, respectively.

The fuel is provided through a fuel nozzle 1235 to the combustion chamber 1240. The compressed air is mixed with the fuel and then is ignited in the combustion chamber 1240 by means of a spark plug (not shown). Subsequently, the combusted gas is discharged to the turbine 1300 so as to rotate the turbine blade. During the operation of the combustor 1200, a sensor needs to monitor the combustion dynamics and, thus, the sensor measures frequency and amplitude of the combustion dynamics outside the combustor 1200. The impedance tube 2000 including the sensor comprises a waveguide including a hot tube disposed inside the combustor 1200 and a cold tube disposed outside the combustor 1200, and the sensor being connected to the cold tube. That is, the combustion system 1500 according to an embodiment of the subject invention comprises the combustor 1200 and the impedance tube 2000.

Figure 3:
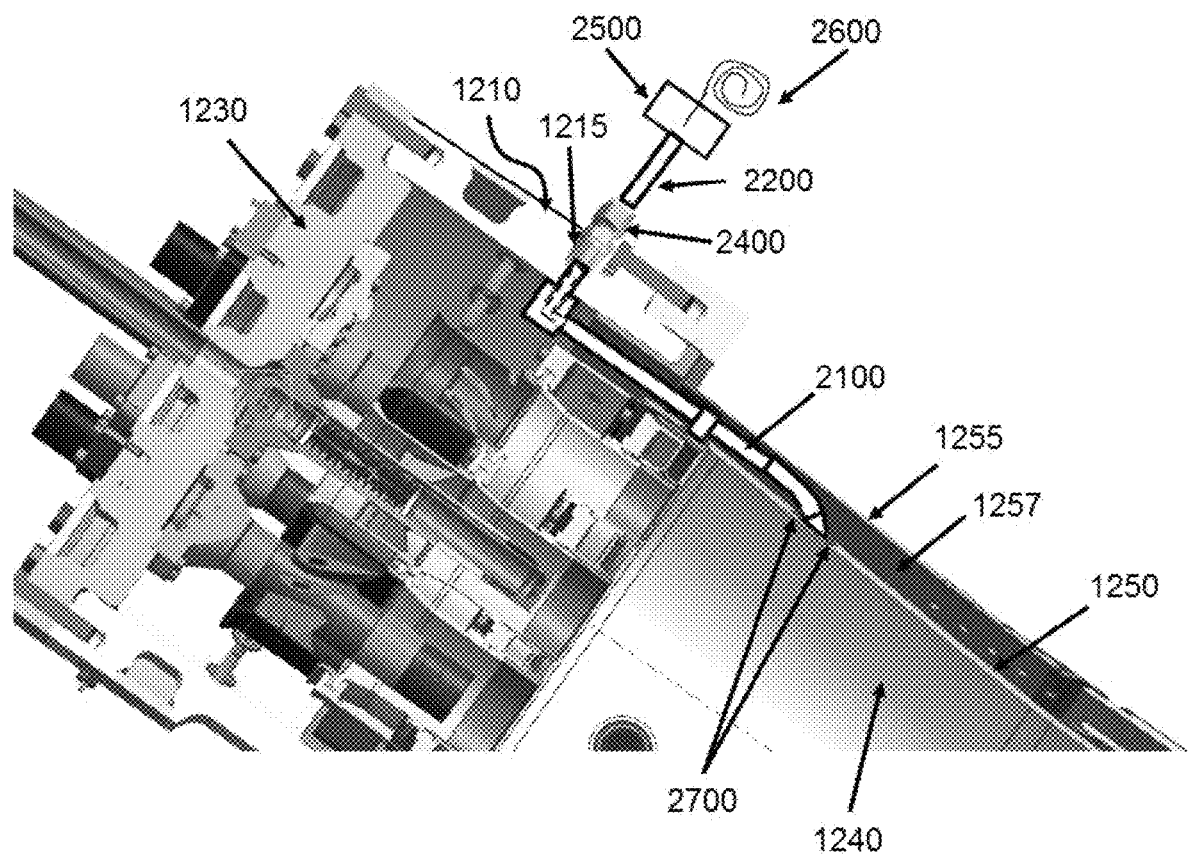
FIG. 3 shows an enlarged view of a combustion system according to an embodiment of the present invention.
Figure 4:
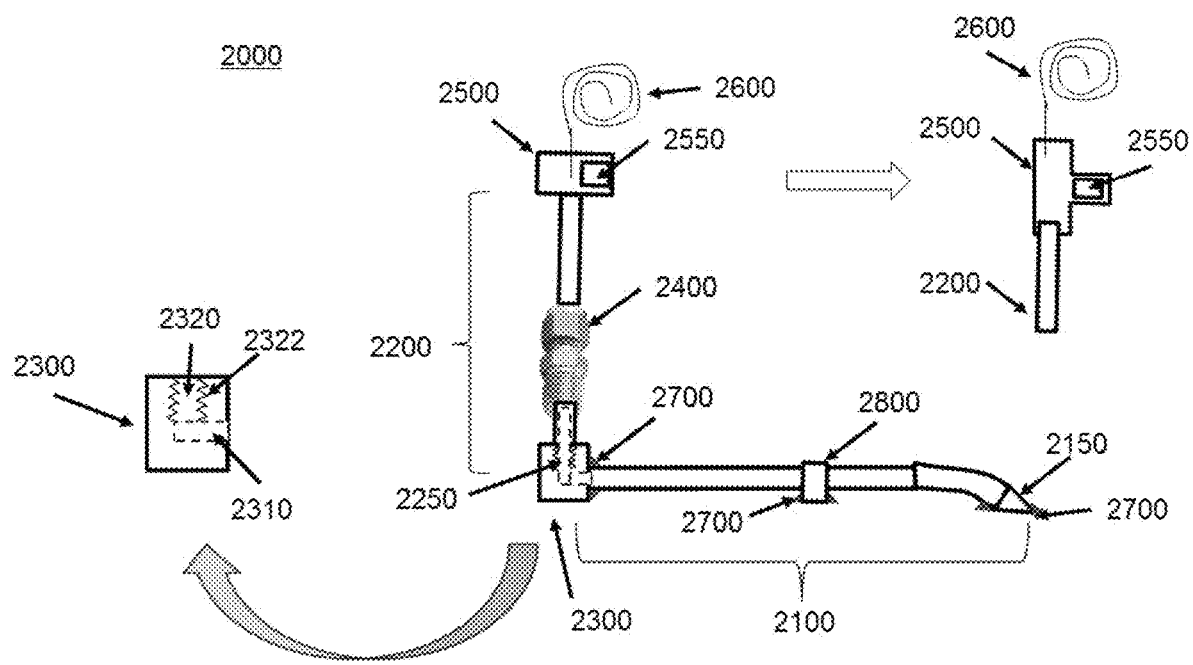
FIG. 4 shows an impedance tube according to an embodiment of the present invention.

FIG. 3 shows an enlarged view of a combustion system according to an embodiment of the present invention. FIG. 4 shows an impedance tube according to an embodiment of the present invention.

Referring to FIGS. 2-4, the combustion system 1500 comprises the combustor 1200 and the impedance tube 2000. The impedance tube 2000 comprises a machined union 2300, a first tube 2100 connected to the machined union 2300, a second tube 2200 connected to the machined union 2300, a sensor housing 2500 including a sensor 2550 and connected to the second tube 2200, and an infinite tube 2600 connected to the sensor housing 2500.

The first tube 2100 is disposed in the liner channel 1257 and extended into the liner channel 1257 from the machined union 2300. A first distal end of the first tube 2100 is connected to the machined union 2300 through a weld 2700 and a second distal end of the first tube 2100 faces the inner liner 1250. The first tube 2100 comprises a port 2150 at the second distal end disposed in the liner channel 1257, and the port 2150 faces the inner liner 1250 surrounding the combustion chamber 1240. The port 2150 may be attached to the inner liner 1250 through the weld 2700. In addition, the supporter 2800 is disposed on the inner liner 1250 and supports the first tube 2100. The supporter 2800 is fixed on the inner liner 1250 through the weld 2700.

The second tube 2200 passes through the casing 1210 such that a first distal end of the second tube 2200 is connected to the machined union 2300 disposed inside the casing 1210. The casing 1210 provides a casing bore 1215 for the second tube 2200, and the compression fitting 2400 is disposed in the casing bore 1215. As a result, the second tube 2200 passes through the compression fitting 2400, and the compression fitting 2400 seals a space between the casing bore 1215 and the second tube 2200.

The machined union 2300 is disposed inside the casing 1210 and connects the first tube 2100 to the second tube 2200. The machined union 2300 comprises a first channel 2310 and a second channel 2320, wherein the first channel 2310 is connected to the first tube 2100, and the second channel 2320 is connected to the second tube 2200. The machined union 2300 includes a channel thread 2322 on the second channel 2320 such that a threaded end 2250 formed on the first distal end of the second tube 2300 is coupled with the channel thread 2322. The first channel 2310 and the second channel 2320 are connected to each other at 90° degrees.

The sensor housing 2500 is disposed outside the casing 1210 and includes the sensor 2550. The sensor housing 2500 is connected to the second end of the second tube 2200 and the infinite tube 2600. The signal provided from the second tube 2200 is guided to the infinite tube 2600, and the sensor 2550 of the sensor housing 2500 measures frequency, amplitude, or pressure. The infinite tube 2600 allows the signal to pass the sensor 2550 and then to be damped.

In the subject invention, the first tube 2100 and the second tube 2200 can have an inner diameter of at least ¼ inch, thereby inhibiting excessive damping. The first tube 2100 is fixed on the inner liner 1250 through the weld 2700, and the second tube 2200 passes through the casing 1210 through the compression fitting 2400, thereby inhibiting the loose fitting from flying to the combustor and the turbine. In addition, the impedance tube 2000 of the subject invention does not affect the installation or uninstallation of combustion system during assembly or disassembly, thereby reducing the cost of reinstalling and routing the sensor.

The subject invention includes, but is not limited to, the following exemplified embodiments.

Embodiment 1

An impedance tube, comprising:
a machined union including a first channel and a second channel;
a first tube connected to the first channel of the machined union;
a second tube connected to the second channel of the machined union;
a sensor housing including a sensor and connected to the second tube; and
an infinite tube connected to the sensor housing;
wherein the second channel includes a channel thread, and
wherein a threaded end of the second tube is coupled with the channel thread of the second channel.

Embodiment 2

The impedance tube according to embodiment 1, wherein the first tube is attached to the machined union through a weld.

Embodiment 3

The impedance tube according to any of embodiments 1-2, further comprising a compression fitting, wherein the second tube passes through the compression fitting.

Embodiment 4

The impedance tube according to any of embodiments 1-3, wherein the first channel and the second channel are connected to each other at 90° degrees.

Embodiment 5

A combustion system, comprising:
a liner defining a combustion chamber;
a casing covering the combustion chamber;
a first tube disposed in the liner;
a machined union disposed inside the casing and connected to the first tube;
a second tube passing through the casing and connected to the machined union;
a sensor housing disposed outside the casing and connected to the second tube; and
an infinite tube connected to the sensor housing.

Embodiment 6

The combustion system according to embodiment 5, wherein the liner comprises an inner liner surrounding the combustion chamber, an outer liner surrounding the inner liner, and a liner channel between the inner liner and the outer liner.

Embodiment 7

The combustion system according to embodiment 6, wherein the first tube comprises a port at a distal end and the port faces the inner liner.

Embodiment 8

The combustion system according to embodiment 7, wherein the port is welded to the inner liner.

Embodiment 9

The combustion system according to any of embodiments 6-8, further comprising a supporter welded to the inner liner, wherein the first tube is attached to the supporter.

Embodiment 10

The combustion system according to any of embodiments 5-9, wherein the casing comprises a casing bore and the second tube passes through the casing bore.

Embodiment 11

The combustion system according to embodiment 10, further comprising a compression fitting disposed in the casing bore, wherein the second tube passes through the compression fitting.

Embodiment 12

The combustion system according to any of embodiments 5-11, wherein the machined union comprises a first channel connected to the first tube and a second channel connected to the second tube.

Embodiment 13

The combustion system according to embodiment 12, wherein the second channel includes a channel thread, and the second tube comprises a threaded end configured to be coupled with the channel thread of the second channel.

Embodiment 14

The combustion system according to any of embodiments 12-13, wherein the first channel and the second channel are connected to each other at 90° degrees.

Embodiment 15

The combustion system according to any of embodiments 5-14, wherein an inner diameter of the first tube is equal to or larger than ¼ inch.

Embodiment 16

The combustion system according to any of embodiments 5-15, further comprising a sensor disposed in the sensor housing.

Embodiment 17

A gas turbine, comprising:
a compressor providing compressed air;
a combustor receiving the compressed air and producing combusted gas;
a turbine receiving the combusted gas from the combustor; and
an impedance tube monitoring combustion dynamics of the combustor,
wherein the impedance tube comprises:
a first tube disposed in the combustor;
a machined union disposed inside the combustor and connected to the first tube;
a second tube passing through a casing of the combustor and connected to the machined union;

a sensor housing disposed outside the combustor and connected to the second tube; and
an infinite tube connected to the sensor housing.

Embodiment 18

The gas turbine according to embodiment 17, wherein the machined union comprises a first channel connected to the first tube and a second channel connected to the second tube.

Embodiment 19

The gas turbine according to embodiment 18, wherein the second channel includes a channel thread, and the second tube comprises a threaded end coupled with the channel thread of the second channel.

Embodiment 20

The gas turbine according to any of embodiments 17-19, further comprising a compression fitting passing through the casing, wherein the second tube passes through the compression fitting.

Embodiment 21

The gas turbine according to any of embodiments 17-20, wherein the sensor housing comprises a sensor.

Embodiment 22

The gas turbine according to any of embodiments 17-21, wherein the combustor comprises an inner liner surrounding a combustion chamber, an outer liner surrounding the inner liner, and a liner channel between the inner liner and the outer liner, and the first tube is extended in the liner channel.

Embodiment 23

The gas turbine according to embodiment 22, wherein the first tube comprises a port facing the inner liner.

Embodiment 24

The gas turbine according to embodiment 23, wherein the port is fixed to the inner liner through a weld.

Embodiment 25

The gas turbine according to any of embodiments 17-24, wherein the casing comprises a casing bore such that the second tube passes through the casing bore.

Embodiment 26

The gas turbine according to any of embodiments 17-25, further comprising a transition piece between the combustor and the turbine.

Embodiment 27

The gas turbine according to embodiment 26, wherein the transition piece comprises an inner transition piece guiding the combusted gas from the combustion chamber to the turbine and an outer transition piece surrounding the inner transition piece.

Embodiment 28

The gas turbine according to embodiment 27, wherein the outer transition piece comprises a transition hole.

Embodiment 29

The gas turbine according to any of embodiments 17-28, wherein the combustor comprises a fuel nozzle providing fuel.

Embodiment 30

A combustion system, comprising:
an inner liner defining a combustion chamber;
an outer liner spaced apart from the inner liner and surrounding the inner liner;
a head end plate and a casing that cover the combustion chamber, the inner liner, and the outer liner;
a machined union disposed inside the casing;
a first tube connected to the machined union and extended in a liner channel between the inner liner and the outer liner;
a second tube passing through the casing and connected to the machined union;
a sensor housing including a sensor and connected to the second tube; and
an infinite tube connected to the sensor housing.

Embodiment 31

The combustion system according to embodiment 30, wherein the outer liner comprises a liner hole.

Embodiment 32

The combustion system according to any of embodiments 30-31, further comprising a fuel nozzle providing a fuel to the combustion chamber.

Embodiment 33

The combustion system according to any of embodiments 30-32, wherein the machined union comprises a first channel connected to the first tube and a second channel connected to the second tube.

Embodiment 34

The combustion system according to embodiment 33, wherein the second channel includes a channel thread, and a threaded end of the second tube is coupled with the channel thread of the second channel.

Embodiment 35

The combustion system according to any of embodiments 30-34, further comprising a compression fitting passing through the casing, wherein the second tube passes through the compression fitting.

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

EXAMPLE 1

In the subject invention, a combustion system can include: a liner defining a combustion chamber; a casing covering the combustion chamber; a first tube disposed in the liner; a machined union disposed inside the casing and connected to the first tube; a second tube passing through the casing and connected to the machined union; a sensor housing disposed outside the casing and connected to the second tube; and an infinite tube connected to the sensor housing.

Figure 5:
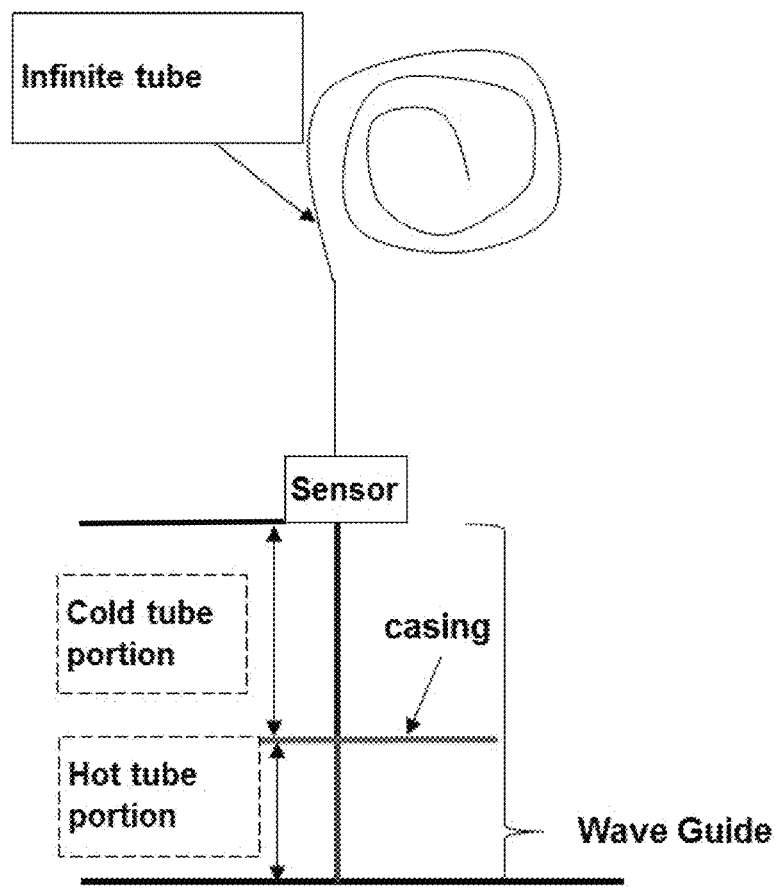
FIG. 5 shows a schematic view of an impedance tube according to an embodiment of the present invention.

FIG. 5 shows a schematic view of an impedance tube according to an embodiment of the present invention. Referring to FIGS. 2-5, the impedance tube comprises a waveguide transferring signal, a sensor measuring the signal, and an infinite tube coupled with the sensor. The waveguide comprises a hot tube portion disposed in the hot temperature condition and a cold tube portion disposed in the cold temperature condition. That is, the hot tube portion is disposed inside the casing and the cold tube portion is disposed outside the casing. Compared to the impedance tube 2000 of FIGS. 3 and 4, the hot tube portion corresponds to the first tube 2100, the machined union 2300, and a part of the second tube 2200; and the cold tube portion corresponds to the other part of the second tube 2200.

Figure 6A:
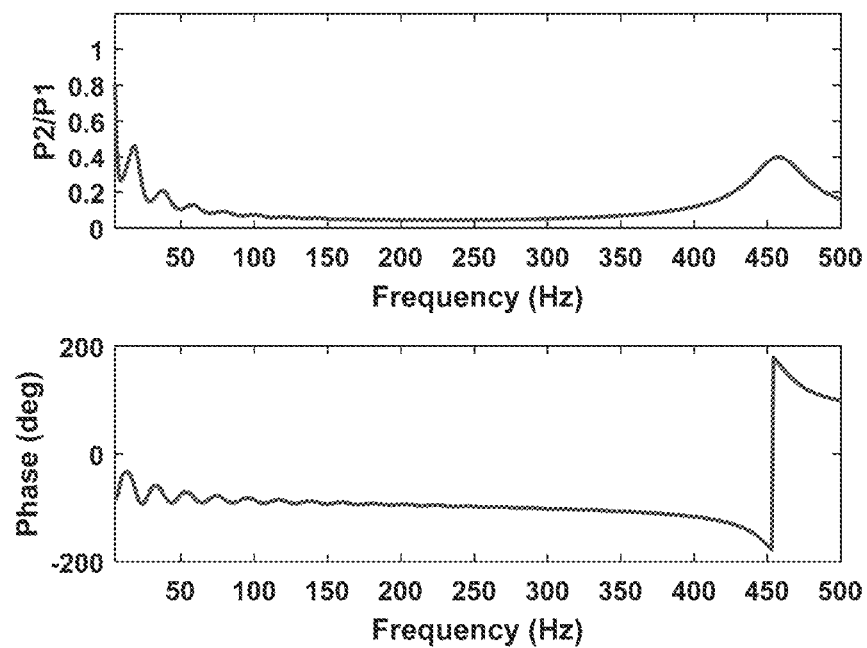
FIG. 6(a) shows a simulation result of an impedance tube having an inner diameter of 1/16 inch.
Figure 6B:
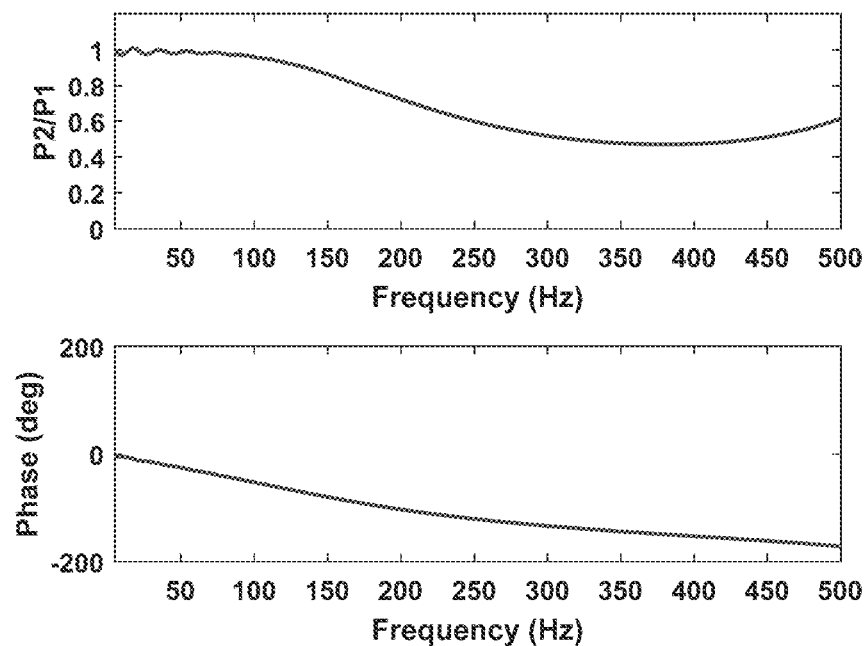
FIG. 6(b) shows a simulation result of an impedance tube having an inner diameter of ¼ inch.

FIG. 6(a) shows a simulation result of an impedance tube having an inner diameter of 1/16 inch, and FIG. 6(b) shows a simulation result of an impedance tube having an inner diameter of 1/4 inch. In both simulations of FIGS. 6(a) and 6(b), the infinite tube has a length of 150 ft., and a length of the cold tube portion is longer than a length of the hot tube portion. Referring to FIG. 6(a), when the impedance tube uses the small inner diameter (e.g., 1/16 inch), a second pressure P2 of the cold tube portion is excessively damped with respect to a first pressure P1 of the hot tube portion. However, when the impedance tube uses the large inner diameter (e.g., 1/4), the second pressure P2 of the cold tube portion is not excessively damped with respect to the first pressure P1 of the hot tube portion.

It should be understood that the examples and embodiments described herein are for illustrative purposes only and that various modifications or changes in light thereof will be suggested to persons skilled in the art and are to be included within the spirit and purview of this application. Thus, the invention is not intended to limit the examples described herein, but is to be accorded the widest scope consistent with the principles and novel features disclosed herein.

What is claimed is:

1. An impedance tube, comprising:
   a machined union including a first channel and a second channel;
   a first tube connected to the first channel of the machined union;
   a second tube connected to the second channel of the machined union;
   a sensor housing including a sensor and connected to the second tube; and
   an infinite tube connected to the sensor housing;
   wherein the second channel includes a channel thread, and
   wherein a threaded end of the second tube is coupled with the channel thread of the second channel.

2. The impedance tube according to claim 1, wherein the first tube is attached to the machined union through a weld.

3. The impedance tube according to claim 1, further comprising a compression fitting, wherein the second tube passes through the compression fitting.

4. The impedance tube according to claim 1, wherein the first channel and the second channel are connected to each other at 90° degrees.

5. A combustion system, comprising:
   a liner defining a combustion chamber;
   a casing covering the combustion chamber;
   a first tube disposed in the liner;
   a machined union disposed inside the casing and connected to the first tube;
   a second tube passing through the casing and connected to the machined union;
   a sensor housing disposed outside the casing and connected to the second tube; and
   an infinite tube connected to the sensor housing.

6. The combustion system according to claim 5, wherein the liner comprises an inner liner surrounding the combustion chamber, an outer liner surrounding the inner liner, and a liner channel between the inner liner and the outer liner.

7. The combustion system according to claim 6, wherein the first tube comprises a port at a distal end and the port faces the inner liner.

8. The combustion system according to claim 7, wherein the port is welded to the inner liner.

9. The combustion system according to claim 7, further comprising a supporter welded to the inner liner, wherein the first tube is attached to the supporter.

10. The combustion system according to claim 7, wherein the casing comprises a casing bore and the second tube passes through the casing bore.

11. The combustion system according to claim 10, further comprising a compression fitting disposed in the casing bore, wherein the second tube passes through the compression fitting.

12. The combustion system according to claim 11, wherein the machined union comprises a first channel connected to the first tube and a second channel connected to the second tube.

13. The combustion system according to claim 12, wherein the second channel includes a channel thread, and the second tube comprises a threaded end configured to be coupled with the channel thread of the second channel.

14. The combustion system according to claim 13, wherein the first channel and the second channel are connected to each other at 90° degrees.

15. The combustion system according to claim 13, wherein an inner diameter of the first tube is equal to or larger than 1/4 inch.

16. The combustion system according to claim 13, further comprising a sensor disposed in the sensor housing.

17. A gas turbine, comprising:
   a compressor providing compressed air;
   a combustor receiving the compressed air and producing combusted gas;
   a turbine receiving the combusted gas from the combustor; and
   an impedance tube monitoring combustion dynamics of the combustor,
   wherein the impedance tube comprises:
      a first tube disposed in the combustor;
      a machined union disposed inside the combustor and connected to the first tube;
      a second tube passing through a casing of the combustor and connected to the machined union;
      a sensor housing disposed outside the combustor and connected to the second tube; and
      an infinite tube connected to the sensor housing.

18. The gas turbine according to claim 17, wherein the machined union comprises a first channel connected to the first tube and a second channel connected to the second tube.

19. The gas turbine according to claim 18, wherein the second channel includes a channel thread, and the second tube comprises a threaded end coupled with the channel thread of the second channel.

20. The gas turbine according to claim 19, further comprising a compression fitting passing through the casing, wherein the second tube passes through the compression fitting.

* * * * *